Feb. 5, 1935.   J. J. ZELLER   1,989,839
WHEEL COVER
Filed Feb. 1, 1932
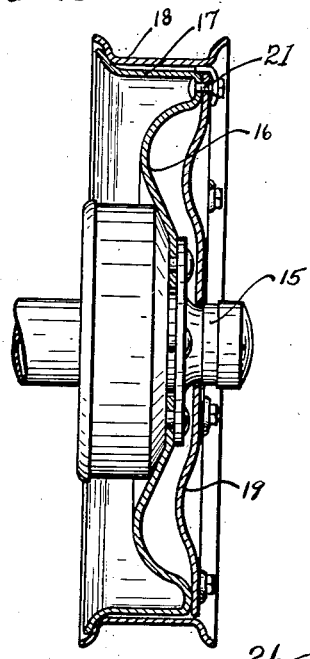
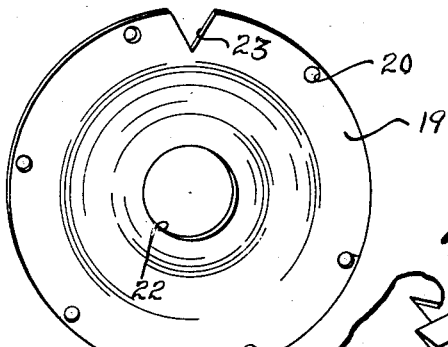
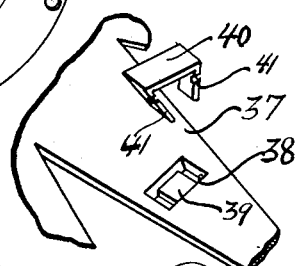
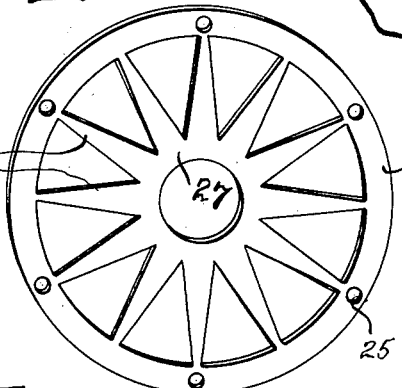
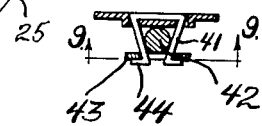
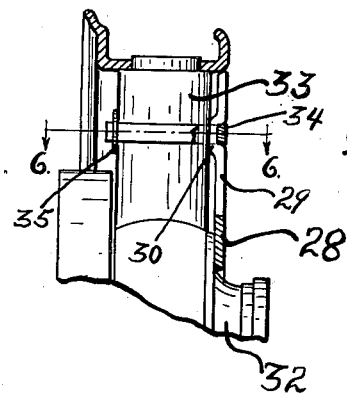
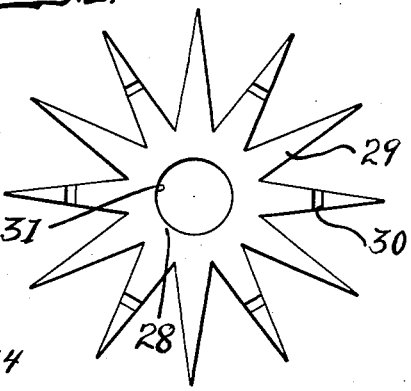
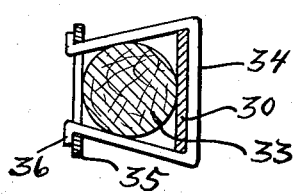
INVENTOR.
JOHN J. ZELLER
BY
ATTORNEY Patented Feb. 5, 1935

1,989,839

UNITED STATES PATENT OFFICE 1,989,839

WHEEL COVER

John J. Zeller, Detroit, Mich.

Application February 1, 1932, Serial No. 590,005

1 Claim. (Cl. 301—37)

My invention relates to a new and useful improvement in a wheel cover adapted for mounting on the side of a vehicle wheel and serving as a cover therefor so that an attractive and ornamental appearance may be easily, quickly and cheaply effected on vehicle wheels of various types and structures.

It is an object of the present invention to provide a device of this class which will be simple in structure, economical of maufacture, durable, light, easily and quickly assembled and one which will afford a ready means for ornamenting the vehicle wheel and varying the appearance of the design of the wheels.

Another object of the invention is the provision of a device whereby the wheels, while being made uniformly and consequently on a cheap and production basis, may be made to bear individuality in coloring, appearance and design.

Other objects will appear hereinafter.

The invention consists in the combination and arrangement of parts hereinafter described and claimed.

The invention will be best understood from a reference to the accompanying drawing which forms a part of this specification and in which Fig. 1 is a central vertical sectional view of a disk wheel showing the invention applied, Fig. 2 is a side elevational view of one form of the invention, Fig. 3 is a side view of another form of the invention, Fig. 4 is a plan view of another form of the invention, Fig. 5 is a fragmentary sectional view of a spoke bearing wheel with the form shown in Fig. 4, attached thereto, Fig. 6 is a sectional view taken on line 6—6 of Fig. 5, Fig. 7 is a fragmentary perspective view of another modified form of the invention, Fig. 8 is a transverse sectional view through one of the spoke engaging members of the form shown in Fig. 7, Fig. 9 is a sectional view taken on line 9—9 of Fig. 8.

The form which I have illustrated in Fig. 1 and Fig. 2 is adapted for use with a disk wheel having the hub 15, radiating outwardly from which is the main body or disk 16 provided with the axially directed flange forming portion 17 which serves as a support for the tire rim 18. The cover 19 may be formed from any suitable material although I prefer to form the same from a suitable sheet metal. The outer face of the cover 19 may be of any suitable finish, color or ornamentation to suit the individual taste, and to match in with the color contrast or harmony, whichever the case may be, of the vehicle as a whole. This cover 19 is provided adjacent its periphery with the openings 20 through which may be projected bolts 21 whereby the cover is secured to the wheel body. A central opening 20 is formed in the cover 19 through which the hub 15 may project. It is believed obvious that the cover may itself serve to cover the hub if such a structure would be desirable. A notch 23 is formed in the edge of the cover 19 to accommodate the tire valve stem which projects outwardly of the outer face of the conventional disk wheel.

The form shown in Fig. 3 is adapted for use with vehicle wheels having a felly and spokes. The ring 24 may be secured to the wheel felly in such a manner that the radiating arms 26 which project outwardly from a central body or plate 27 may cover the spokes of the wheel. The ring 24 is provided with holes 25 through which the securing bolts may be passed.

The form shown in Fig. 4 is also adapted for use on a wheel having spokes 33 radiating outwardly from the hub 32 which is projected through the central opening 31 formed in the cover plate 28 from which radiate the arms 29. Each of these arms is provided with an inward off-set or recess as at 30 in which engages the bight 34 of a U-shaped clip which is adapted to embrace with its legs the spoke 33. The ends 36 of the legs of this clip are projected through a washer or ring 35 and outwardly turned so as to secure the cover in position.

In the form shown in Fig. 7 the cover plate is provided with outwardly radiating arms 37 in each of which, intermediate its ends, is formed an opening 38 across which projects a bar 39, leaving at opposite sides thereof sufficient space through which may extend the legs 41 which project from the bight 40 of the U-shaped clip. This form is especially adapted for use with vehicle wheels having wire spokes 42. The legs 41 embrace the spoke 42 and project through the washer or ring 43 which is bulged outwardly at diametrically opposite points to accommodate the legs 41. The ends 44 of these legs are turned over the washer so as to secure the cover plate in position on the wheel.

It is believed that from the description thus given it will appear obvious how the objects sought may be accomplished and the ornamental effect desired attained. The device may be easily and quickly assembled in position and will produce the ornamental effect in a cheap manner which would require considerable expense were the wheel body itself to be so decorated. The cover is of course made of light material so that little weight is added to the weight of the wheel. The cover will also, no matter what the material may be from which it is made, serve to reenforce and strengthen the wheel.

While I have illustrated and described the preferred forms of construction I do not wish to limit myself to the precise details of structure shown but desire to avail myself of such variations and modifications as come within the scope of the appended claim.

Having thus described my invention what I claim as new and desire to secure by Letters Patent is:

A wheel cover of the class described, comprising: a main body portion; arms radiating outwardly from said body portion for serving as a cover for the spokes of a vehicle wheel; securing clips engaging each of said arms and embracing a spoke; and a washer positioned at the side of each of said spokes opposite to the side engaged by said arms and having a slot formed therein for passage of the ends of the clip therethrough, the ends of said clip being upset over said washer.

JOHN J. ZELLER.